United States Patent [19]

Roberts et al.

[11] Patent Number: 4,640,734
[45] Date of Patent: Feb. 3, 1987

[54] METHOD AND APPARATUS FOR ASSEMBLING LARGE PANELS

[75] Inventors: Ernest E. Roberts, DeSoto, Tex.; Paul H. Hansel, Thousand Oaks; William O. Hudgens, Camarillo, both of Calif.

[73] Assignee: Atlantic Richfield Company, Los Angeles, Calif.

[21] Appl. No.: 613,853

[22] Filed: May 24, 1984

[51] Int. Cl.⁴ .............................. B30B 5/00; B30B 9/00
[52] U.S. Cl. ...................................... 156/562; 156/285; 156/297; 156/567; 156/580; 156/583.8; 100/93 P; 100/178; 100/193; 100/269 A; 100/233
[58] Field of Search .................... 156/272, 4, 285, 358, 156/567, 571, 580, 583.8, 539, 297, 562; 100/93 P, 178, 193, 202, 223, 257, 269 A, 917, 233; 29/810; 294/65.5; 269/8; 335/285; 221/212; 414/606; 248/205.3, 206.5

[56] References Cited

U.S. PATENT DOCUMENTS

| | | | |
|---|---|---|---|
| 1,657,227 | 1/1928 | Owen | 100/93 P |
| 1,754,853 | 4/1930 | Fox et al. | 100/93 P |
| 2,337,250 | 12/1943 | Klassen | 156/583.8 |
| 2,713,379 | 7/1955 | Sisson | 100/917 |
| 3,355,209 | 11/1967 | Richards, Jr. et al. | 294/65.5 |
| 3,771,438 | 11/1973 | Radakovich | 100/269 A X |
| 3,808,968 | 5/1974 | Notin | 156/580 X |
| 3,971,688 | 7/1976 | Abbott | 156/295 |
| 4,220,491 | 9/1980 | Metcalf et al. | 156/285 |
| 4,468,848 | 9/1984 | Anderson et al. | 156/297 X |

Primary Examiner—Michael Wityshyn
Assistant Examiner—Ramon R. Hoch
Attorney, Agent, or Firm—Drude Faulconer

[57] ABSTRACT

An apparatus for assembling large panels, e.g. solar panels, from smaller, preformed sections comprising a plurality of press tables which are coupled to a carousel structure whereby each table can be located at one work station and then moved through a series of controlled stops to an unloading station. Each press table is comprised of a frame having a smooth surface onto which the preformed sections of the panels are positioned and, a press rack which is lowered to bring supports into contact with the adhesive on the backs of the preformed sections to form the large panel.

9 Claims, 9 Drawing Figures

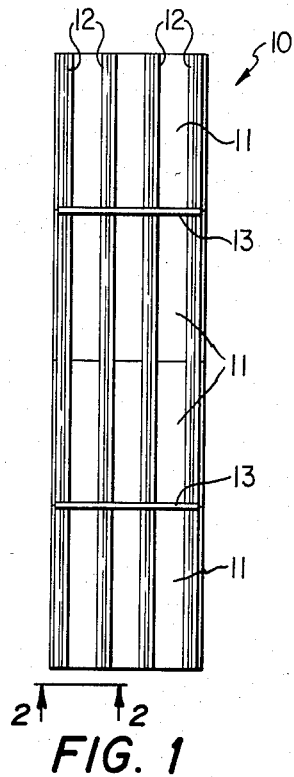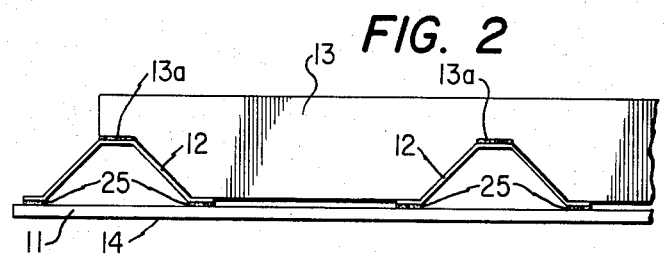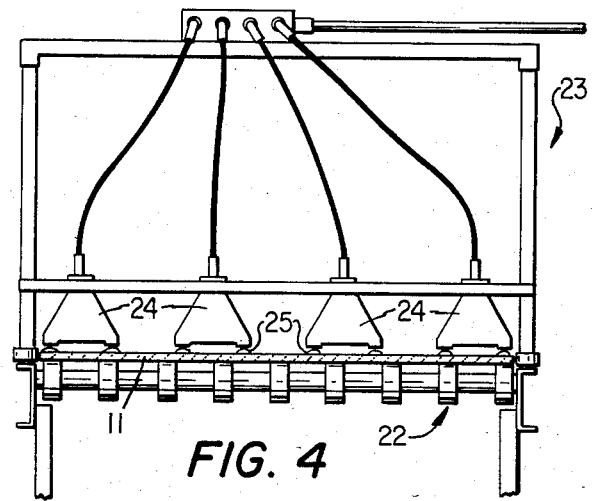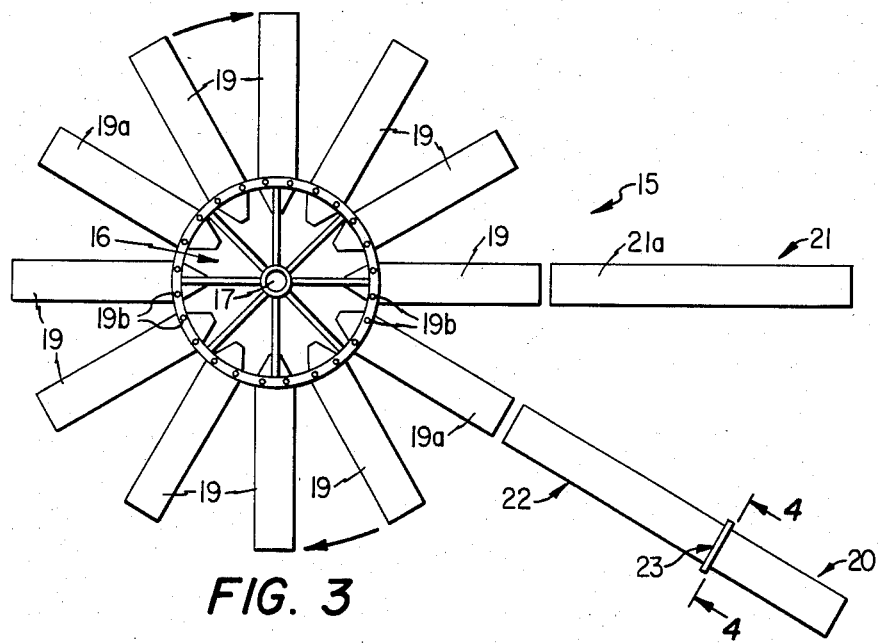

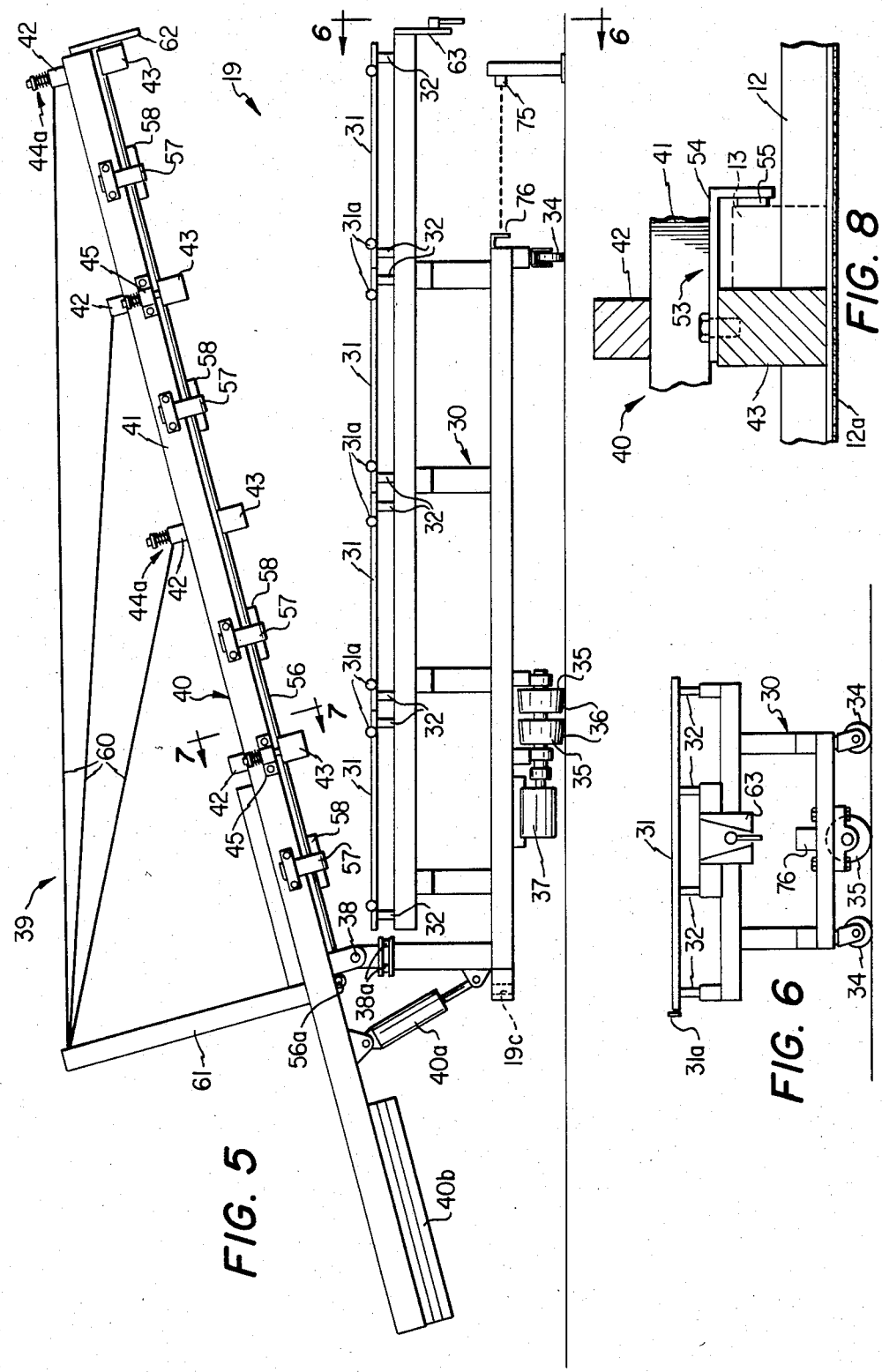

METHOD AND APPARATUS FOR ASSEMBLING LARGE PANELS

DESCRIPTION

1. Technical Field

The present invention relates to a method and apparatus for assembling a panel and more particularly relates to a quick and efficient method and apparatus for assembling large panels, e.g. solar panels, from individual, preformed sections.

2. Background Act

In recent years, considerable efforts have been made to harness solar energy and convert it into useful energy forms. In almost all such efforts, large panels are used in some form to collect and/or reflect the sun's rays. For example, large panels having mirrored surfaces are mounted on heliostat frames and positioned to reflect and/or focus the sun's rays onto collectors which, in turn, generate heat or otherwise utilize the reflected rays to generate some other form of energy, e.g. direct conversion into electrical energy by photovoltaic cells or the like. The photovoltaic cells, themselves, are often assembled into large panels similar in size and configuration as those having the mirrored surfaces and are mounted on heliostat frames to catch the sun directly or to receive reflected rays.

Heretofore, due to the delicate nature of the materials involved and the size and weight of an assembled panel, the assembly of these panels has been both expensive and time consuming. For example, in one known assembly technique, a large, extremely smooth and level surface (e.g. a slab of polished granite) is required on which a plurality of smaller, preformed sections are laid, face down, in a prescribed and aligned relationship. The backs of the sections are then carefully marked and adhesive is applied along these markings. Longitudinal supports are individually placed over the adhesive and across the backs of all the sections and cross-supports are individual positioned across the longitudinal supports at spaced interval. After all supports are in place, dead weight, e.g. sandbags, etc., is applied to the supports and maintained until the adhesive is cured. This procedure produces only one panel every 60 minutes with the labor and cost efficiencies being much less than desired.

DISCLOSURE OF THE INVENTION

The present invention provides a method and apparatus for quickly and efficiently assembling large panels, e.g. solar panels, from smaller, preformed sections. The present system is space and labor efficient and produce a substantially large number of panels in a relatively short period of time wherein all panels are of a consistent, high quality and reliability.

More specifically, the present invention provides a system having a plurality of press tables coupled to a carousel structure whereby each table can be loaded at one work station and then moved in a circular path by the carousel through a series of controlled stops to an unloading station. During each of said controlled stops, another of the press tables is loaded and the table adjacent the unloading station is unloaded. The unloaded table is positioned next to the loading station so that an unloaded table is always moved to the loading station when the carousel is stepped.

The construction of each press table is substantially identical and each is comprised of a frame mounted on and supported by roller means which rest on the floor the assembly area. The frame has a smooth surface onto which the preformed sections of the panels are positioned, face down, after having an adhesive automatically applied to desired portions of the backs thereof by an adhesive applicator. Pivotably mounted to the frame is a press rack which, in turn, has a plurality of press bars resiliently mounted at spaced intervals thereon.

The press bars have magnetic means thereon for releasably securing the longitudinal and cross-supports for the panel to be assembled to the press bars. With the preformed sections properly aligned and with all supports in place, the press rack is lowered to bring the longitudinal supports into contact with the adhesive on the backs of the preformed sections. The press rack is then latched to the frame and boots, which are carried by the press rack, are inflated to apply pressure to the supports. This pressure is maintained until the loaded table has been stepped around to the unloading station by which time the adhesive will be cured. At the unloading station, the boots are deflated, the rack raised, and the assembled panel is removed.

It can be seen that only small work crews are required at the loading and unloading stations to carry out the continuous assembly operation of the present invention.

BRIEF DESCRIPTION OF THE DRAWINGS

The actual contruction, operation, and apparent advantages of the present invention will be better understood by referring to the drawings in which like numerals identify like parts and in which:

FIG. 1 is a plan view of the back of a typical panel assembled in accordance with the present invention;

FIG. 2 is an enlarged, end view taken along line 2—2 of FIG.1;

FIG. 3 is a plan view of the carousel system of the present invention;

FIG. 4 is a sectional view of the adhesive applicator means of the present invention taken along line 4—4 of FIG. 3.;

FIG. 5 is an elevational view of a press table of the present invention;

FIG. 6 is an end view of a press table taken along the line 6—6 of FIG. 5;

FIG. 8 is a sectional view taken along line 8—8 of FIG. 7; and

BEST MODE FOR CARRYING OUT THE INVENTION

Figure 7:
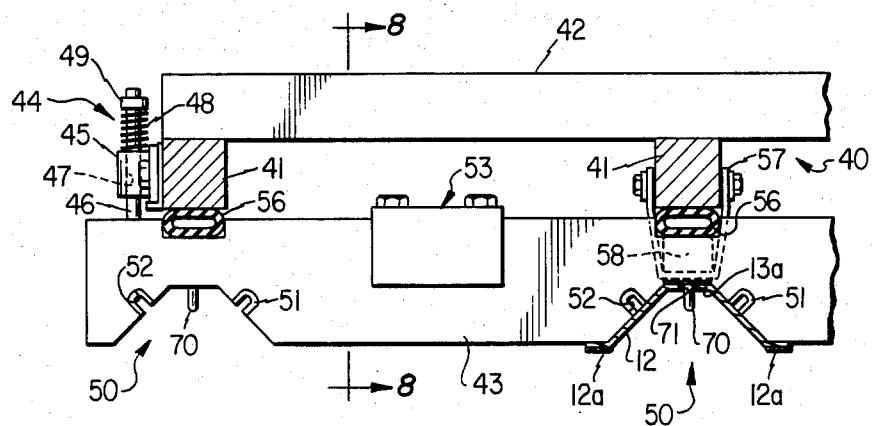
FIG. 7 is a sectional view taken along line 7—7 of FIG. 6.
Figure 9:
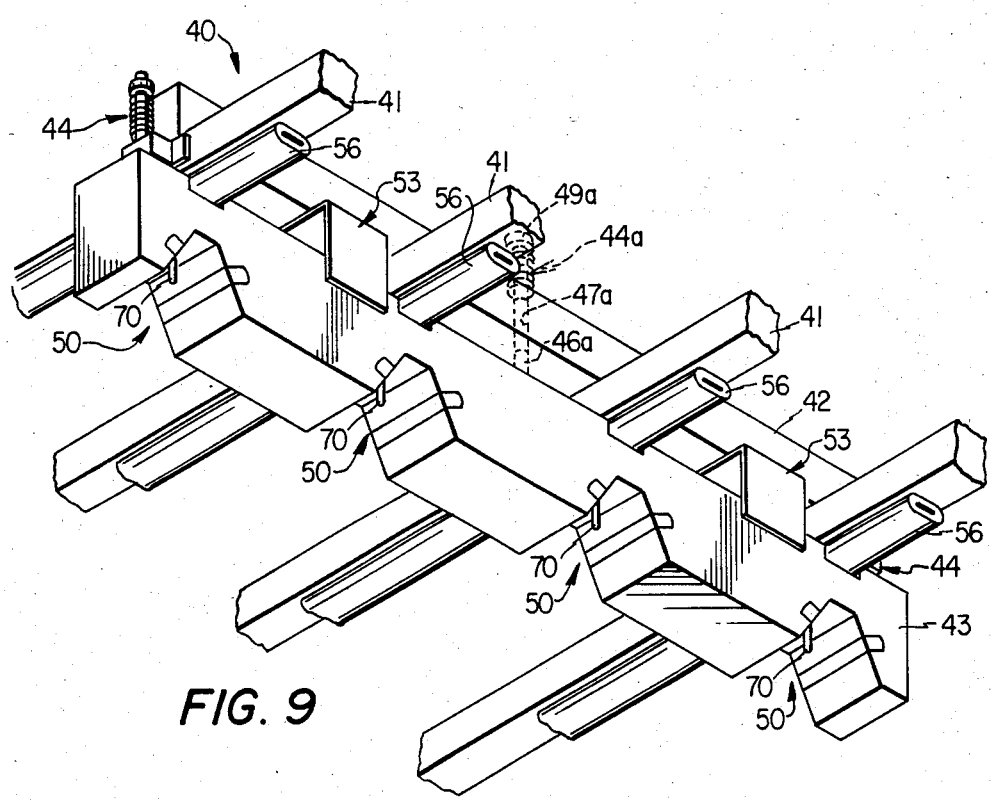
FIG. 9 is a perspective view, partly broken away, of the press rack of the present invention.

Referring more particularly to the drawings, FIGS. 1 and 2 disclose a panel 10 having a construction typical of a panel which is to be assemblied in accordance with the present invention. Basically, panel 10 is comprised of a plurality of individual, preformed sections 11 (four shown in FIG. 1) which are aligned end-to-end and spaced in close proximity and then secured together by one or more longitudinal support members 12 (four shown in FIG. 1). Support members 12 are positioned across the backs of all sections 11 and glued thereto. Cross-supports 13 are secured across supports 12 at spaced intervals to add structural integrity and strength to the assemblied panel 10. When used in the solar energy industry, it will be understood that sections 11 may have a reflective glass surface to reflect and/or focus the sun's rays or may have plurality of photovoltaic cells on the surface thereof if the panel is to be used for the direct conversion of sunlight into electricity.

Referring now to FIG. 3, an overall system 15 in accordance with the present invention is desclosed by which panels 10 can be reliably and safety assembled in a relatively short period of time. System 15 is comprised of a carousel structure 16 which is rotatable mounted on pylon axle 17 which, in turn, is securely anchored in the floor of the assembly area. Attached at spaced intervals around the outer periphery 18 of carousel 16 are a plurality of press tables 19. For illustration purpose, twelve tables 19, spaced at 30° intervals have been shown, but it should be understood that more or less tables, spaced at different angular relationships, can be used without departing from the present invention.

As shown in FIG. 3, there are two permanently-positioned work stations 20,21, each of which always align with one of tables 19 when carousel 16 is in a properly stopped and indexed position. Work station 20 is comprised of conveyor 22 onto which section 11(e.g. 4 foot by 4 foot reflective glass or photovoltaic sections) are loaded. Each section 11 is manually or otherwise positioned, face down, on the rear of conveyor 22 and are properly spaced, one from the other, as conveyor 22 slowly moves the sections toward table 19. As sections 11 move along conveyor 22, they are automatically aligned before they pass through adhesive applicator means 23 (FIGS. 3 and 4) where nozzles units 24 lay down lines or beads 25 of adhesive onto the backs of section 11. As shown, each nozzle unit 24 provides two lines 25 of adhesive so a total of eight separate lines 25 are applied onto the back of each section 11 for a purpose described below.

As sections 11 moves through adhesive applicator 23 and reach the forward end of conveyor 22, they are manually or otherwised moved into position onto the table 19 which is substantially aligned with conveyor 22. The operation is now at the point where longitudinal supports 12 and cross-supports 13 are ready to be affixed to the backs of sections 11 to form a panel 10. To fully understand how this is accomplished in the present invention, the detail of press table 19 will now be set forth.

The basic construction of each press table 19 is identical. As illustrated, table 19 (FIGS. 5 and 6) is comprised of a frame 30 on which a plurality of milled top plates 31 (four shown) are mounted by adjustable bolts 32. Plates 31 are preferably of heavy, stable material (e.g. ¾ inch thick steel) which has been milled and/or polished to provide an extremely level and smooth surface, a plurality of adjustable jack bolts 32 (only a few shown for clarity) connect the plates 31 to frame 30 and are individually manipulated to adjust the height and to properly level plates 31 with respect to frame 30 and to each other.

Frame 30 is supported on the floor of the assembly area by wheel means, e.g. casters 34 which are pivotably mounted near the outer end of frame 30 and a set of tandem wheels 3 transversely journaled on frame 30 toward its inner end. Preferably, the outer surfaces 36 of wheels 35 are slightly tapered inwardly to allow the wheels to follow a circular "footprint" when table 19 is rotated to a new position about pivot point 17. The taper of wheels 35 prevents "scuffing" or sliding of these wheels as they roll across the assembly area floor as the tables 19 are moved to a different position around pylon 17.

As stated above, the basic structure of each table 19 is identical. However, at least one of tables 19 (preferably two, diametrically-opposed tables, designated as 19a in FIG. 3) further include a power means 37, e.g. electric motor or equivalent, which is mounted on frame 30 and operably coupled to wheels 35 to drive same upon command. It can be seen as motor 37 rotates wheels 35 to move table 19a in a circular direction about pylon 17, carousel structure 16 will likewise be rotated thereby causing all tables 19 to rotate to their next position about pylon 17. Frame 30 of each table 19 is affixed to carousel structure by pins 19b (FIG. 3) which are positioned through openings 19c (FIG. 5) on the frame.

Pivotably mounted to frame 30 about pivot 38 is press rack 39. Rack 39 comprises a frame support structure 40 which, as illustrated, is comprised of a plurality of longitudinal struts 41 (four shown) which are joined together by cross-struts 42. Power means 40a (pneumatic or hydraulic cylinder or equivalent) is coupled between rack 39 and frame 30 to rotate rack 39 on command about pivot 38 to raise rack 39 to an "up" position away from frame 30 and a "down" position. When in the "down" position, rack 39 will be substantially parallel to the surface of plates 31 and will be properly spaced there from. If the thickness of sections 11 vary, the spacing of rack 39 from plates 31 can be adjusted by jack bolts 38a (FIG. 5) to raise or lower pivot 38. Counterweight 40b is provided at the inner end of rack 39 to at least partially equalize the weight of rack 39 on either side of pivot 38 which aids in moving rack 39 between its up and down positions.

Carried at spaced points along frame support structure 40 are one or more press bars 43 (four shown in FIG. 5). Each press bar 43 is mounted on press rack 39 for limited movement away from and towards frame support structure 40. Two different means are illustrated for mounting press bars 43 to provide the desired limited movement. The first of these means 4 (FIGS. 5 and 7) is comprised of a housing which is bolted or otherwise secured to outer struts 41 adjacent a press bar 43. Pins 46 are affixed to the upper surface of press bar 43 near the outer ends thereof and are slidably received through openings 47 in respective housings 45. A return spring 48 is positioned onto that portion of pin 46 that extends above housing 45 and is held thereon by retainer nut 49 or equivalent. The second means 44a used to moveably mount press bar 43 to press rack 39 is comprised of a pin 46a affixed to bar 43 near the center thereof and which is received through an opening 47a in cross-strut 42. Return spring 48a is positioned on pin 46a above strut 42 and is held in place by retainer 49a.

Each press bar 43 has one or more recesses 50 (four shown) in the lower surface thereof. Recesses 50 are spaced on each bar 43 so that each recess on a particular bar is in logitudinal alignment with the recesses in the same relative position on all of the other said press bars. Each set of aligned recesses on press bars 43 form a channel into which one of metallic support members 12 of panel 10 is adapted to be positioned. Support member 12 is releasably held in its respective channel by a releasably securing means which, in turn, is comprised of permanent magnets 51 which are positioned in slots 52 within recesses 50.

Also secured to press bar 43 is a means 53 for releasably securing a metallic cross-support 13 of panel 10 to press bar 43. Means 53 is comprised of one or more L-shaped members 54 which are bolted or otherwise secured to the top of press bar 43 and which have a permanent magnet 55 thereon.

Extending along the lengths of struts 41 of frame support structure 40 is one or more inflatable, elongated boots 56. Each boot 56 is positioned between a respective strut 41 and each of press bars 43 and is additionally supported along its length by straps 57 (FIGS. 5 and 7) which, in turn, are bolted or otherwise secured to the strut 41. A pad 58 of rubber or similar elastic material is positioned within each strap 57 between the strap and its respective boot.

If needed for added stability and strength, one or more guy wires 60 are run from mast 61 on frame support structure 40 to various cross-struts 42. Further, cooperating, releasable latch means 62, 63 are provided on frame 30 and press rack 39 to lock the press rack 39 in its down position. With the structural details of system 15 having now been described, the operation of system 15 is assembling panels 10 is set forth below.

Sections 11 are positioned face down on conveyor 22 in their desired, aligned relationship. As should be understood, preformed sections 11 may be of various constructions (e.g. reflective glass sections, photovoltaic array sections, etc.) al long as they have a substrate (back) capable of having support member glued thereto. Preformed sections 11 are passed along conveyor 22 and through adhesive applicator 23 where adhesive is applied to the backs of all sections 11. In the present illustration, applicator means 23, applies eight lines of adhesive to each section 11. These lines of adhesive 25 (FIG. 4) are carefully spaced so that they will underlie the parallel surfaces 12a (FIG. 7) of the four longitudinal supports 12 when he supports are positioned across the backs of sections 11.

After sections 11 pass through applicator means 23 and reach the front of conveyor 22, they are manually or otherwise transferred to the table 19 which is then in alignment with conveyor 22. In the present illustration, four of the 4 foot by 4 foot preformed sections 11 with the lines of adhesive on the backs thereof are positioned, face down, onto plates 31 against stops 31a and are properly aligned onto the plates 31.

One or more cross-supports 13 (e.g. aluminized steel) having adhesive applied to the inner surfaces 13a (FIG. 2) thereof are positioned into respective securing means 53 on cross bars 43 and are releasably held therein by magnets 55. One or more longitudinal supports 12 (e.g. 16 foot long, aluminized steel "hat sections") are positioned within their respective channels formed by aligned recesses 50 in press bars 43 and are releasably held therein by magnets 51. To insure the final proper longitudinal positioning of supports 12 with respect to the aligned sections 11 on plates 31, preformed and prespaced holes 71 (FIG. 7) in supports 12 are aligned with index pins 70 which, in turn, are secured in recesses 50 on press bars 43.

With longitudinal supports 12 and cross-supports 13 in place in press rack 39 and with preformed sections 11 properly aligned on plates 31, power cylinder 40a is actuated to rotate rack 39 about pivot 38 to its down position. As rack 39 is rotated to its down position, parallel surfaces 12a (FIG. 7) are brought into contact with a respective line 25 of adhesive on the backs of section. Means 62, 63 are latched to lock rack 39 in the down position.

Compressed air is then supplied to boots 56 through plenum 56a (FIG. 5) to inflate all of the boots simultaneously. As the boots inflate, they force press bars 43 and, hence, supports 12 downward into firm contact with the adhesive on sections 11. Also, pads 58 in straps 57 are pressed downward against supports by inflated boots 56 to provide additional pressure along the lengths of supports 12. Still further, boots 56 apply pressure against cross-supports 13 to force the adhesive-coated surfaces 13a thereof into firm contact with supports 12 to thereby bond the two together.

When latch means 62, 63 are secured and boots 56 are fully inflated, motor means 37 on tables 19a are actuated to drive wheels 36, thereby causing carousel 16 to rotate thereby moving all of tables 19 in a clockwise direction (FIG. 3). A sensor 75, e.g. electric eye, (FIG. 5) is positioned at any one of the stations of carousel 16 to sense a reflective surface 76 (one on each table 19) to automatically stop motor 37 when tables 19 have been stepped to their next adjacent location about pylon 17.

In the present illustrative example, the total time it takes to load (e.g. 3 minutes) each table 19 at work stations 20 and to step it around through each stop to work station 21 is preferably equal to or is greater than the time it takes the adhesive being used to cure (e.g. 30 minutes). By spacing tables 29 accordingly, panel 10 in a table will be ready for removal by the time that table has been stepped around to work station 21, air is exhausted from boots 56 and springs 48, 48a move press bars 43 upward which aids in deflating boots 56. Latch means 62, 63 are released and power cylinder 40a is actuated to raise rack 39 to its up position. The weight of panel 10 is such that it overcomes the holding power of magnets 51, 55 so panel 10 will remain on plates 31 as rack 39 is raised. The panel is then manually or otherwise removed from table 19 and placed on conveyor 21a which carries the assembled panel 10 away from 19. The completed panel is then removed from the rear of conveyor 21a for further handling. Once a table is unloaded at work station 21, it is now ready to be indexed to adjacent work station 20 where the described loading operation is completed.

It should be recognized that some modifications can be made to the process described above without departing from the present invention. For example, the adhesive can be applied directly to the supports 12 instead of/or in addition to the adhesive being applied to the backs of sections 11 and/or to the cross-supports 13 as described.

What is claimed is:

1. A system for assembling panels from a plurality of preformed sections, said system comprising:
   a carousel structural pivotably mounted in the floor of an assembly area;
   a plurality of press tables attached to said carousel structure and adapted to be rotated thereby, each of said press tables comprising;
   a frame;
   one or more plates mounted on said frame, and said plates forming a surface adapted to receive the number of said preformed sections necessary to form said panels in an aligned relationship;
   means for applying adhesive to said preformed sections;
   wheel means on said frame positioned between said frame and the floor of said assembly area;
   a press rack pivotably mounted on said frame and adapted to move between an up position away from said surface and a down position where said press rack is substantially parallel and adjacent said surface; said press rack comprising;

a frame support structure;

means on said frame support structure for releasably securing one or more support members to said frame support structure in a position where each of said support members will contact and rest on, and adhesively bond to all of said preformed sections on said surface when said press rack is in a down position; means for applying pressure to each of said support members downward toward said sections when said press rack is in a down position; and means to rotate said carousel structure to thereby simultaneously move all of said plurality of press tables in a circular direction.

2. The system of claim 1 wherein said means for releasably securing said support members to said press rack comprises:

one or more press bars spaced along said press rack, each of said press bars having one or more recesses therein, said recesses being positioned so that respective recesses on adjacent press bars are aligned to receive one of said support members; and means for mounting each of said press bars to said frame support structure for limited movement away from and toward said frame support structure.

3. The system of claim 2 wherein said means for releasably securing said support members include:

magnets mounted in said recesses on said press bars.

4. The system of claim 3 wherein said means for applying pressure to said support members comprises:

one or more inflatable boots positioned between said frame support structure and each of said press bars.

5. The system of claim 4 including:

means on said one or more press bars for releasably securing one or more cross-supports to said press bar in a position where each of said cross-members will be in contact with each of said support members.

6. The system of claim 5 including:

power means to move said press rack between said up and down positions.

7. The system of claim 6 wherein said power means comprises:

a work cylinder connected between said frame and said frame support section.

8. The system of claim 7 wherein said wheel means comprises:

at least one chapter pivotably mounted near the outer end of said frame; and at least one wheel journalled to said frame near the inner end of said frame.

9. The system of claim 8 wherein said means to rotate said carousel structure comprises:

a motor mounted on at least one of said plurality of press tables; and means to connect said motor to said at least one wheel journalled on said at least one of said plurality of said press tables to drive said at least one wheel.

* * * * *